United States Patent
Nihei

(10) Patent No.: US 7,333,234 B2
(45) Date of Patent: Feb. 19, 2008

(54) METHOD AND PROGRAM FOR PRODUCING A REDUCED IMAGE

(75) Inventor: Kaname Nihei, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 845 days.

(21) Appl. No.: 10/107,487

(22) Filed: Mar. 28, 2002

(65) Prior Publication Data

US 2002/0140951 A1    Oct. 3, 2002

(30) Foreign Application Priority Data

Mar. 28, 2001    (JP) ............................. 2001-093896

(51) Int. Cl.
  *B41B 1/00*   (2006.01)
  *G06F 15/00*  (2006.01)
(52) U.S. Cl. ...................... 358/1.2; 358/3.28
(58) Field of Classification Search ................. 358/1.2, 358/3.28, 1.12, 1.15, 1.16, 1.18
See application file for complete search history.

(56) References Cited

U.S. PATENT DOCUMENTS

| | | | | |
|---|---|---|---|---|
| 5,706,457 A | * | 1/1998 | Dwyer et al. | 715/835 |
| 5,761,655 A | * | 6/1998 | Hoffman | 707/4 |
| 6,381,029 B1 | * | 4/2002 | Tipirneni | 358/1.14 |
| 6,654,509 B2 | * | 11/2003 | Nishikawa et al. | 382/298 |
| 6,668,134 B1 | * | 12/2003 | Niikawa | 386/95 |
| 6,876,389 B1 | * | 4/2005 | Honma | 348/333.12 |
| 6,952,684 B2 | * | 10/2005 | Toshikage et al. | 705/54 |
| 6,964,025 B2 | * | 11/2005 | Angiulo et al. | 715/838 |

FOREIGN PATENT DOCUMENTS

| | | | |
|---|---|---|---|
| JP | 63-233475 A | 9/1988 | |
| JP | 10-174052 A | 6/1998 | |

OTHER PUBLICATIONS

Getting Images Into Photoshop—Increasing the size of the work canvas.*

* cited by examiner

*Primary Examiner*—Thomas D. Lee
(74) *Attorney, Agent, or Firm*—Birch, Stewart, Kolasch & Birch, LLP

(57) ABSTRACT

A reduced-image producing method is performed by an apparatus comprising an image reading section, an image displaying section, and an image processing section. The image reading section reads an original image, which is recorded in an image recording medium of an MO disk and so forth, via a media I/F section. The image displaying section displays the original image on a CRT. The image processing section produces a template image based on image information of the original image. The template image is composed on a reduced image produced by reducing the original image. The template image may be composed on a padding region provided at a peripheral portion of the reduced image. The reduced image produced in this way is displayed or printed as a thumbnail image.

37 Claims, 4 Drawing Sheets

METHOD AND PROGRAM FOR PRODUCING A REDUCED IMAGE

BACKGROUND OF THE INVENTION

1. Field of the Invention

The present invention relates to a method and a program for producing a reduced image of which image information is distinguishable.

2. Description of the Related Art

In recent years, a number of images recorded in a memory has increased as the memory has higher capacity. Among the many images recorded in the high-capacity memory, a user selects a certain image to be outputted (to be displayed or to be printed). At this time, an index image is outputted first by an image output device. In the index image, are arranged thumbnail images produced by reducing the recorded images. The user searches the index image with the eyes to select the desired image. Such a way is generally performed.

As to a reduced-image producing method in which the reduced image is distinguishable, it is known that the thumbnail images respectively reduced in a fixed image size are arranged so as to correspond to image information stored in each of image files, such as described in Japanese Patent Laid-open Publication No. 63-233475 (Japanese Patent No. 2596740). Meanwhile, in the reduced-image producing method described in Japanese Patent Laid-open Publication No. 10-174052 (Japanese Patent No. 3019791), the respective images are reduced at a predetermined rate. In this case, the image size is distinguished on the basis of its display size.

However, the above reduced-image producing methods need to display the image information every image. Thus, there is a shortcoming in that much labor is required for displaying the information. Moreover, the different sizes of the reduced images disfigures the arrangement thereof. In addition, it is necessary to coordinate the display sizes and display positions in accordance with the respective image sizes so that much labor is required. Since image processing is complicated and has priority in comparison with other processes, it takes a lot of time. In a case that multitask processing is executed, the other processes are likely to be affected.

SUMMARY OF THE INVENTION

In view of the foregoing, it is a primary object of the present invention to provide a method and a program for producing a reduced image, in which image information is easily distinguished.

It is a second object of the present invention to provide a method and a program for producing a reduced image, in which image processing is prevented from being complicated.

In order to achieve the above and other objects, the reduced-image producing method according to the present invention comprises steps of producing reduced-image data and template-image data. The reduced-image data is for displaying a reduced image of an original image. The template-image data is for displaying image information concerning the original image. The reduced-image producing method further comprises another step of producing composed-image data in which the template-image data is composed on the reduced-image data. Incidentally, the image information is read from additional data stored in an original-image file.

In a preferred embodiment, a padding region is provided outside an area displayed on the basis of the reduced-image data. The composed-image data is produced so as to compose the template-image data on the padding region. In this case, the padding region is preferable to be biased in a predetermined direction.

The reduced-image producing program according to the present invention executes a plurality of processes for producing the reduced-image data of the original image, for producing the template-image data concerning the image information of the original image, and for composing the template-image data on the reduced-image data.

According to the present invention, special processes are not required except a process for reading the reduced image when outputting the distinguishable reduced image. Thus, it is possible to prevent the process from being complicated. Moreover, load is hardly taken for an image processing unit so that other processes are not affected.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
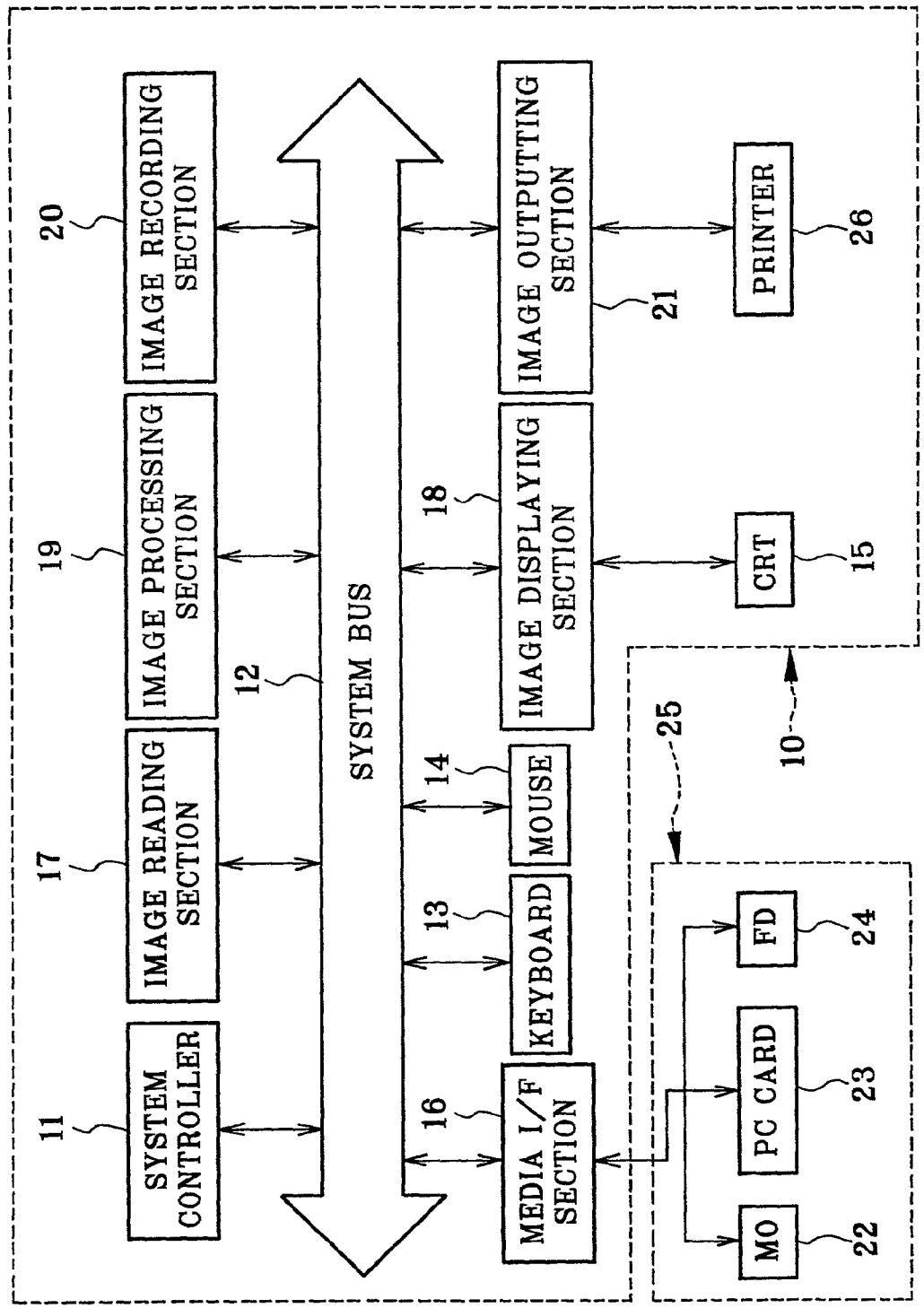
FIG. 1 is a block diagram showing an electrical structure of a reduced-image producing apparatus according to the present invention.

FIG. 1 is a block diagram showing an electrical structure of the present embodiment. A reduced-image producing apparatus 10 is controlled by a system controller 11 including a CPU, a program ROM, a data RAM, and so forth. The system controller 11 is connected to each section of the reduced-image producing apparatus 10 via a system bus 12 to perform transmission and reception of signals.

The system bus 12 is connected to a keyboard 13 and a mouse 14. An operator handles the keyboard 13 and the mouse 14 to operate the reduced-image producing apparatus 10, watching an operational picture displayed on a CRT 15. The system bus 12 is also connected to a media I/F section 16, an image reading section 17, an image displaying section 18, an image processing section 19, an image recording section 20, and an image outputting section 21.

The media I/F section 16 treats various image recording media 25 including an MO disk 22, a PC card 23, and a FD 24. The image recording media 25 store image files 31 of taken images (see FIG. 2). Besides the MO disk 22, the PC card 23 and the FD 24, there are a smart medium, a compact flash memory, and so forth.

The image reading section 17 reads the image file 31 from the image recording media 25 via the media I/F section 16. It is possible to obtain inherent image information from the image file 31.

Figure 2:
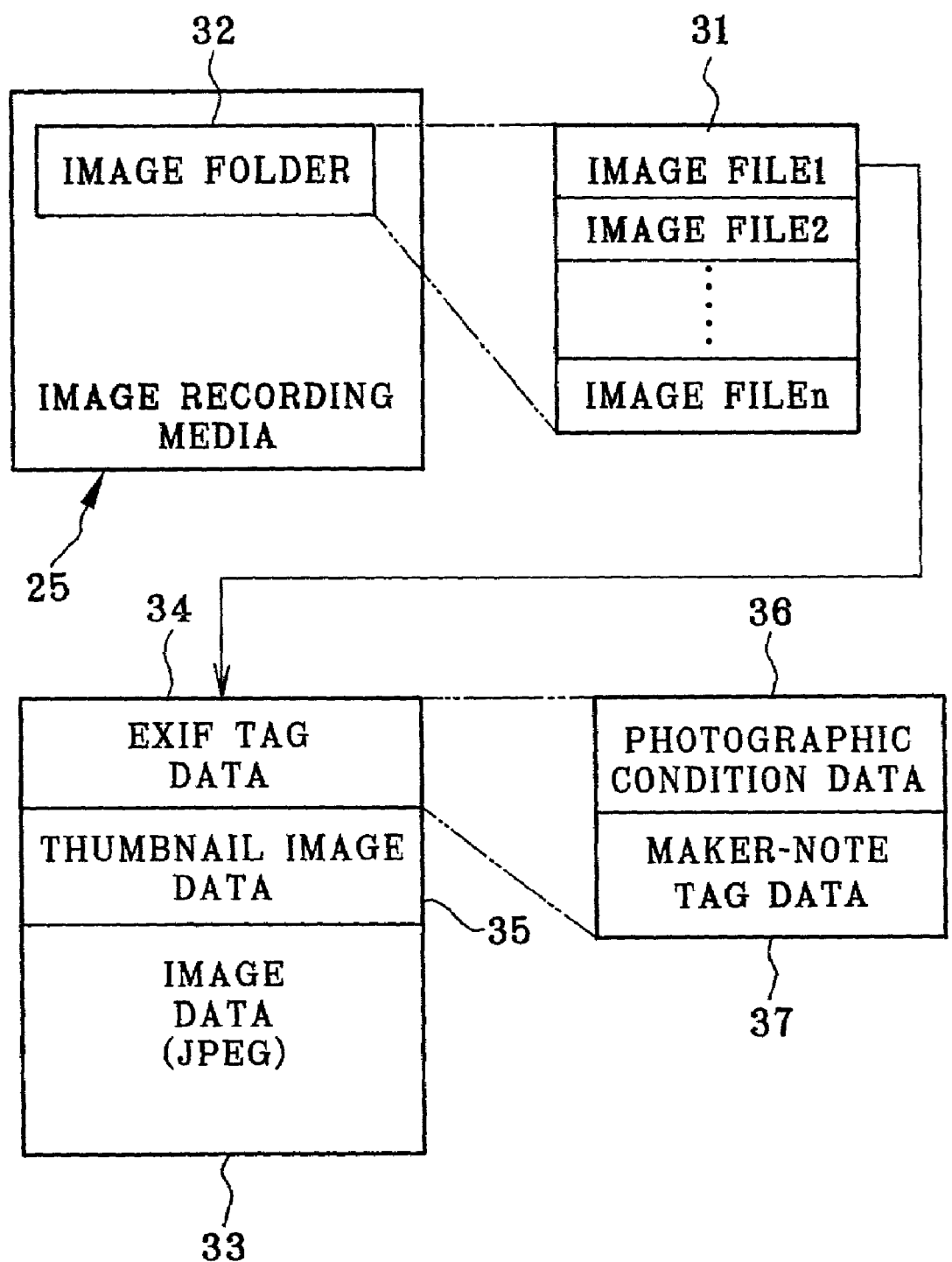
FIG. 2 is an explanatory illustration showing a data structure of image files of taken images.

FIG. 2 is an explanatory illustration showing a file structure of the image files 31. In the image recording media 25, image data of images taken by an electronic still camera or the like are stored as the image files 31. For example, the image file 31 is recorded in EXIF (Exchangeable Image File Format) style. The image files "1" through "n" are stored together in an image folder 32 of the taken images.

Regarding the EXIF style, EXIF tag data 34 is included in addition to the image data 33 recorded in JPEG style for instance. In the JPEG style, the image data 33 is compressed to be stored. The JPEG style is widely utilized, because its compression ratio is high. The JPEG style, however, adopts non-reversible compression system so that image quality deteriorates when restoring the image data.

As to the style of the image data 33, TIFF (Tagged Image File Format) style may be used besides the JPEG style. The TIFF style includes the image data and a tag, which is used to record the information representing a storage position and so forth of the image data. Turning to the EXIF style, it is possible to include thumbnail image data 35 used for displaying an index.

The EXIF tag data 34 includes photographic condition data 36 and maker-note tag data 37. The photographic condition data 36 concerns an exposure value, a focal length, an electronic flash, and so forth. The maker-note tag data 37 is recorded in an area where respective camera makers freely store their inherent information. In this area, for instance, type data of the current camera is recorded. By the way, it is needless to say that the style of the image file 31 is not exclusive to the EXIF style.

The image displaying section 18 outputs image signals to the CRT 15, which displays an operational picture, the images read from the image recording media 25, and so forth. The operational picture is displayed for operating the reduced-image producing apparatus 10 with the keyboard 13 and the mouse 14.

The image processing section 19 mainly executes an image reducing process, a template-image producing process, and an image composing process. During the image reducing process, the image data 33 read from the image file 31 is thinned so as to have an image size of 160×120 dots, in order to produce data of a reduced image. During the template-image producing process, a template image is produced to display the image information, which is read from the image file 31, on the reduced image. With respect to the template image, the image information is converted into letters. In the present embodiment, the produced template image represents a print size. In the image composing process, the template image is composed on the reduced image. Meanwhile, the reduced image is produced only when the image size of the image data 33 is one of 1,500×1,000 dots, 1,500×2,000 dots and 1,500×3,000 dots.

The image recording section 20 records the reduced-image data in the image recording media 25. The reduced-image data may be merely recorded in the image recording media 25 as it is. In the present embodiment, however, the reduced-image data is recorded as the thumbnail image data 35 between the EXIF tag data 34 of the image file 31 and the image data 33 thereof. Consequently, the image file 31 including the thumbnail image data 35 is recorded in the image folder 32. Incidentally, when the thumbnail image data 35 exists in the image file 31, the thumbnail image data 35 is overwritten to be recorded.

The image outputting section 21 converts the image data, which is inputted from the system controller 11, into print data used for printing. The print data is outputted to a printer 26. Instead of printing the image file 31, the thumbnail image data 35 read from the image files 31 may be printed as an index print in which the thumbnail images are composed.

Figure 3:
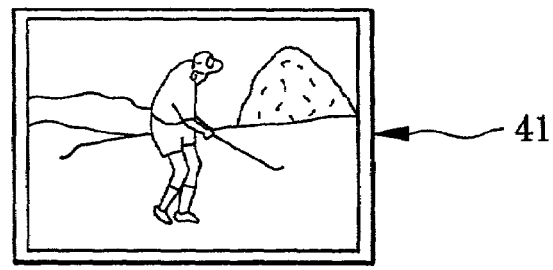
FIG. 3 is an explanatory illustration showing a method for producing a reduced image.
Figure 4:
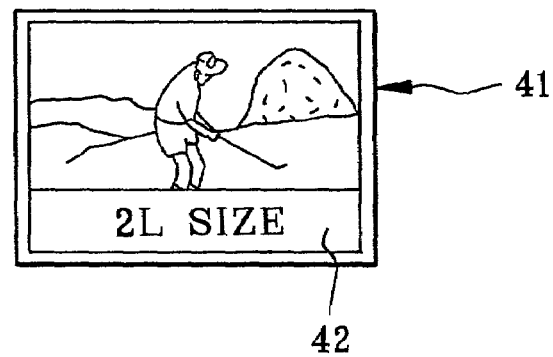
FIG. 4 is an explanatory illustration showing the method for producing the reduced image.
Figure 5:
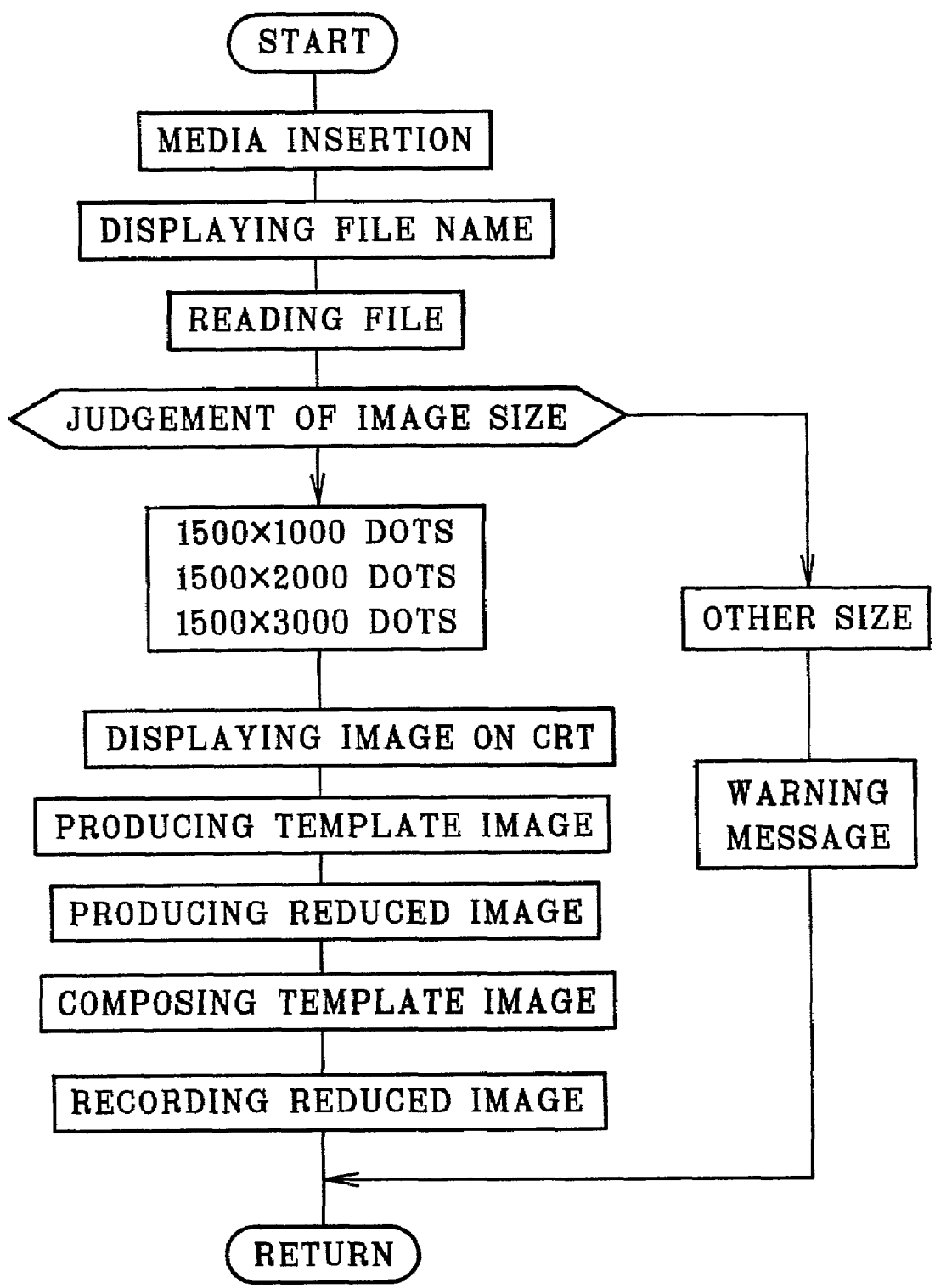
FIG. 5 is a flow chart showing a process for producing the reduced image including image information.

Next, an operation of the above embodiment is described below, referring to FIGS. 3, 4 and 5. FIGS. 3 and 4 show explanatory illustrations of the reduced images. FIG. 5 shows a schematic flow chart. First of all, a power supply of the reduced-image producing apparatus 10 is turned on. Successively, the MO disk 22 recording original images is set to an MO-disk drive (not shown) being as a part of the media I/F section 16. The original image recorded in the MO disk 22 is already processed in a printable state. The image reading section 17 reads a file name from the MO disk 22 to display it on the CRT 15 via the image displaying section 18. After that, the keyboard 13 and the mouse 14 are handled to designate the image file for producing the thumbnail image data.

FIG. 3 is an explanatory illustration showing the reduced image 41 of the image data 33. FIG. 4 is an explanatory illustration showing a thumbnail image in which the template image 42 representing the image information is composed on the reduced image 41. The image reading section 17 reads the designated image file 31 to obtain the image size and the print size of the image data 33 from the EXIF tag data 34. By the way, when the image size of the read image data 33 does not correspond to one of the predetermined image sizes (1,500×1,000 dots, 1,500×2,000 dots and 1,500×3,000 dots), the CRT 15 displays a warning message before returning to a file selection menu. The warning message is "The image size is improper", for example. Meanwhile, when the image size of the read image data 33 is one of the predetermined image sizes, the CRT 15 displays the corresponding image. Incidentally, the reduced image may be produced even if the image size is not one of the predetermined sizes.

As shown in FIG. 4, the template image 42 showing the print size is produced in an image size of 160×30 dots. In this case, the produced template image 42 displays letters of "2L SIZE", a font size of which is sixteen, a color of which is black, and a background of which is white.

The image size of the image data 31 has a pixel number of 1,500×1,000 dots. The taken image is reduced such that the image is thinned so as to have the pixel number of 160×120 dots. As to the taken image reduced to 160×120 dots, vertical ninety-first dot from the top and under thereof are replaced with the template image 42 having the image size of 160×30 dots. In this way, the template image 42 is composed on the reduced image 41. The image recording section 20 records the produced data of the reduced image as the thumbnail image data 35 between the EXIF tag data 34 and the image data 33. Successively, the image file 31 is recorded in the image folder 32 of the MO disk 22 being as one of the image recording media 25.

The thumbnail image is produced in the above-described method. The produced thumbnail images are read to be tidily displayed on the CRT 15. Further, the displayed thumbnail images may be printed by the printer 26. By doing so, it becomes possible to distinguish the image information at a glance. Special processes are not required except the reading process for the thumbnail images so that load is hardly taken for distinguishing the image information.

In the reduced-image producing apparatus according to the above embodiment, the original image is reduced to the image size of 160×120 dots. However, different image sizes are available. For instance, the image may be reduced to an image size of 80×60 dots. Alternatively, a user may optionally determine the image size by handling the keyboard 13 and the mouse 14.

In the above embodiment, the image data showing the image information forms the letters representing the print size. However, another item stored in the EXIF tag data 34 may be represented. For example, the image data may form the image size, a photographic date, an exposure value, and so forth of the taken image. Moreover, a user may designate the image data of the image information by using the keyboard 13 and the mouse 14. Further, information added by the user may be represented.

In the above embodiment, the black letters representing the image information have the font size of sixteen, and are located at a central portion of the template image. However, the letter may have another size and another color, and may be located at another portion. It may be considered that a user designates the letter with the keyboard 13 and the mouse 14. Moreover, in the above embodiment, the image data of the image information is composed on the vertical ninety-first dot and under of the reduced image. However, the image data may be composed on another location of the reduced image. For instance, the image data of the image information may be composed on the vertical first through thirtieth dots. Alternatively, an area on which the image information is composed may be designated by handling the keyboard 13 and the mouse 14.

In the above embodiment, the image size of the original image is one of the three kinds of 1,500×1,000 dots, 1,500×2,000 dots and 1,500×3,000 dots. However, another size may be adopted. The original image is not exclusive to a fixed aspect ratio. In order to produce the reduced image having a fixed size, it is considered to provide a padding region where a proper number of pixels are allocated. In the forgoing embodiment, the template image showing the image information is composed on the reduced image. The template image, however, may be composed on the padding region.

Figure 6:
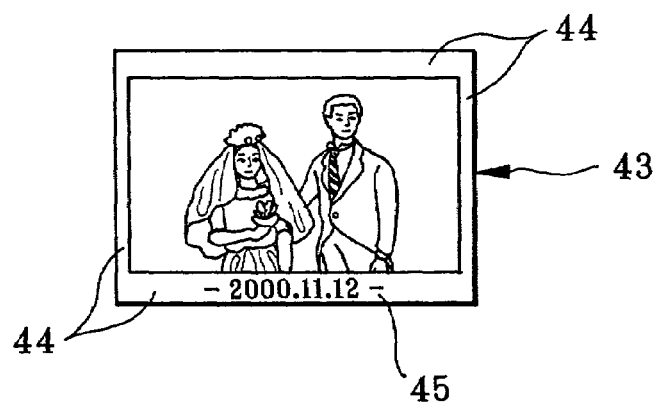
FIG. 6 is an explanatory illustration showing the reduced-image producing method according to another embodiment.
Figure 7:
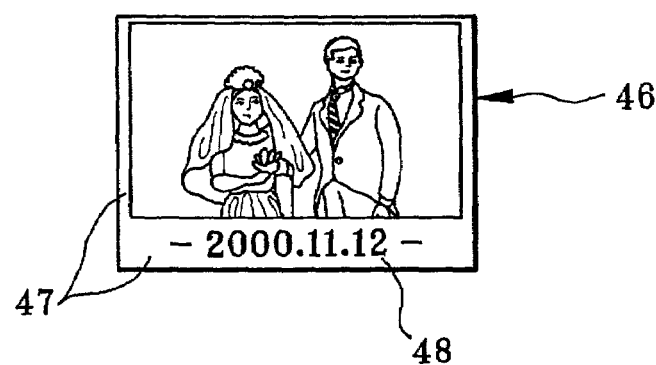
FIG. 7 is an explanatory illustration showing the reduced-image producing method according to the other embodiment.

FIGS. 6 and 7 are explanatory illustrations showing the reduced images including the padding regions. Such as shown in FIG. 6, the reduced image 43 having a fixed size is provided with the padding regions 44 besides a picture image produced by reducing the image data 33. The padding regions 44 are located at four peripheral sides of the reduced image 43. Upon composing the template image 45 on the padding region 44, the reduced image 43 on which the image information is composed is produced without partially masking the original image. Incidentally, the template image 45 represents a photographic date in this case.

Although the padding regions 44 are located at the four sides of the reduced image 43, the padding region may be biased in any direction. In FIG. 7, the padding region 47 is biased downward within the reduced image 46 by allocating a proper number of the lower pixels thereof to the padding region 47. In virtue of this, an area on which the template image 48 is composed is widened. Thus, it is possible to make the template image larger. In other words, it is possible to make letters and so forth of the template image larger, and it is also possible to make a number of the letters increase. Consequently, the image information is adapted to be more easily grasped. Incidentally, with respect to the original images having the image sizes of 1,500×1,000 dots, 1,500×2,000 dots and 1,500×3,000 dots, the padding region may be optionally formed by a user.

A setting of the reduced-image producing apparatus 10 is preferable to be saved in a configuration file. By reading the configuration file, it is possible to easily set the reduced-image producing apparatus 10. By the way, in the above embodiment, the reduced-image producing apparatus, which is equivalent to a personal computer, is used to produce the reduced image. However, the reduced-image producing apparatus may be incorporated into the other electronic apparatus. For instance, it is possible to use it in an electronic still camera with a printer.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A method for producing a reduced image of an original image, comprising the steps of:
   judging whether or not an image size of said original image is a predetermined size;
   producing first image data for displaying said reduced image when said image size of said original image is said predetermined size;
   producing second image data for displaying image information concerning said original image; and
   producing third image data by composing said first image data with said second image data,
   wherein vertical and horizontal picture sizes of the third image data are the same as vertical and horizontal picture sizes the first image data.

2. A method for producing a reduced image according to claim 1, wherein said first image data is made by thinning said original data.

3. A method for producing a reduced image according to claim 1, wherein said image information is drawn from additional data stored in a file of said original image.

4. A method for producing a reduced image according to claim 3, wherein said image information is at least one of a print size, an image size, a photographic date, and an exposure value, which concern said original image.

5. A method for producing a reduced image according to claim 1, wherein said original data of said original image is recorded in respective file of an image recording medium.

6. A method for producing a reduced image according to claim 5, further comprising the step of:
   recording said third image data in said image recording medium.

7. A method for producing a reduced image according to claim 6, wherein said image recording medium is one of an MO disk, a PC card, and a FD.

8. A method for producing a reduced image according to claim 1, wherein said first image data is composed with said second image to produce said third image data such that said second image data overlaps said first image data thereby reducing a viewable region of said first image data.

9. A method for producing a reduced image according to claim 1, wherein said original data of said original image is not modified.

10. A method for producing a reduced image according to claim 1, further comprising the step of:

saving said third image data as thumbnail image data corresponding to said original image in a recording medium.

11. A method for producing a reduced image according to claim 1, further comprising the step of:
allowing a user to determine a size of said reduced image.

12. A method for producing a reduced image according to claim 1, further comprising the step of:
displaying a warning message when said image size of said original image is not said predetermined size.

13. A method for producing a reduced image according to claim 1, further comprising the step of:
printing, based on a selection of the third image data from the user, the original image data corresponding to the selected third image data on a printout,
wherein the printout does not include second image data.

14. A method for producing a reduced image according to claim 1, wherein the original image is recorded in an image data field of an image file in the image recording medium, further comprising:
reading, prior to producing the first image data, the original data of the original image from the image recording medium,
recording the third image data in a thumbnail image data field of the image file in the image recording medium.

15. A method for producing a reduced image of an original image, comprising the steps of:
judging whether or not an image size of said original image is a predetermined size;
producing first image data for displaying said reduced image, on the basis of original data of said original image;
providing a padding region at a periphery of said reduced image when said image size of said original image is not said predetermined size;
producing second image data for displaying image information concerning said original image; and
producing third image data by composing said second image data on said padding region,
wherein vertical and horizontal picture sizes of the third image data are the same as vertical and horizontal picture sizes the first image data.

16. A method for producing a reduced image according to claim 15, wherein said padding region is equally provided in a vertical direction of said reduced image and in a lateral direction thereof.

17. A method for producing a reduced image according to claim 15, wherein said padding region is provided so as to be biased in a predetermined direction.

18. A method for producing a reduced image according to claim 15, wherein said padding region is provided so as to be biased in a downward direction of said reduced image.

19. A method for producing a reduced image according to claim 16 or 18, wherein said image information displayed on said padding region is a photographic date of said original image.

20. A method for producing a reduced image according to claim 15, wherein said original data of said original image is not modified.

21. A method for producing a reduced image according to claim 15, further comprising the step of:
saving said third image data as thumbnail image data corresponding to said original image in a recording medium.

22. A method for producing a reduced image according to claim 15, further comprising the step of:
allowing a user to determine a size of said reduced image.

23. A method for producing a reduced image according to claim 15, further comprising the step of:
displaying a warning message when said image size of said original image is not said predetermined size.

24. A method for producing a reduced image according to claim 15, further comprising the steps of:
printing, based on a selection of the third image data from the user, the original image data corresponding to the selected third image data on a printout,
wherein the printout does not include second image data.

25. A method for producing a reduced image according to claim 15, wherein the original image is recorded in an image data field of an image file in an image recording medium, the method further comprising:
reading, prior to producing the first image data, the original data of the original image from the image recording medium; and
recording the third image data in a thumbnail image data field of the image file in the image recording medium.

26. A method for producing a reduced image according to claim 15, wherein the third image data recorded in the image recording medium includes the reduced image, the padding region at the periphery of the reduced image, and the image information concerning the original image composed on the padding region.

27. A computer-readable medium storing a program, which, when executed by a computer incorporated in an apparatus, produces a reduced image of an original image, said program comprising the steps of:
judging whether or not an image size of said original image is a predetermined size;
producing reduced-image data for displaying said reduced image when said image size of said original image is said predetermined size;
producing image-information data for displaying image information concerning said original image; and
composing said reduced-image data with said image-information data,
wherein vertical and horizontal picture sizes of the third image data are the same as vertical and horizontal picture sizes the first image data.

28. A computer-readable medium according to claim 27, wherein said reduced-image data is made by thinning said original data.

29. A computer-readable medium according to claim 27, wherein said image information is drawn from additional data stored in a file of said original image.

30. A computer-readable medium according to claim 27, further comprising the step of:
recording composition data of said reduced-image data and said image-information data in an image recording medium storing said original data of said original image.

31. A computer-readable medium according to claim 30, wherein said image recording medium is one of an MO disk, aPC card, and a FD.

32. A computer-readable medium according to claim 30, wherein the original data of the original image is recorded in an image data field of an image file in the image recording medium, the program further comprising:
reading, prior to producing the first image data, the original data of the original image from the image recording medium; and
recording the composition data of the reduced-image data and the image information data in a thumbnail image data field of the image file in the image recording medium.

33. A computer-readable medium according to claim 27, wherein said original data of said original image is not modified.

34. A computer-readable medium according to claim 27, said program further comprising the step of:
   saving said composition of said reduced-image data with said image-information data as thumbnail image data corresponding to said original image in a recording medium.

35. A computer-readable medium according to claim 27, said program further comprising the step of:
   allowing a user to determine a size of said reduced image.

36. A computer-readable medium according to claim 27, said program further comprising the step of:
   displaying a warning message when said image size of said original image is not said predetermined size.

37. A computer-readable medium according to claim 27, said program further comprising the step of:
   printing, based on a selection of the third image data from the user, the original image data corresponding to the selected third image data on a printout,
   wherein the printout does not include second image data.

* * * * *